United States Patent [19]

Schwappach

[11] Patent Number: 4,748,754

[45] Date of Patent: Jun. 7, 1988

[54] SHOVEL FOR AN EXCAVATOR

[75] Inventor: Dieter Schwappach, Dortmund, Fed. Rep. of Germany

[73] Assignee: O&K Orenstein & Koppel Aktiengesellschaft, Dortmund, Fed. Rep. of Germany

[21] Appl. No.: 35,643

[22] Filed: Apr. 3, 1987

[30] Foreign Application Priority Data

Apr. 5, 1986 [DE] Fed. Rep. of Germany ....... 3611493

[51] Int. Cl.$^4$ .............................................. E02F 9/28
[52] U.S. Cl. .................... 37/141 R; 37/142 A; 172/713; 172/751; 403/317
[58] Field of Search ............ 37/141 R, 141 T, 142 R, 37/142 A; 403/317; 172/713, 751

[56] References Cited

U.S. PATENT DOCUMENTS

| | | | |
|---|---|---|---|
| 2,603,009 | 7/1952 | Smith | 37/142 R |
| 3,520,076 | 7/1970 | Nichols | 37/141 R |
| 3,812,608 | 5/1974 | Ratkowski | 37/141 T |
| 3,995,384 | 12/1976 | Wood | 37/141 R |
| 4,027,408 | 6/1977 | Ramella et al. | 37/141 T |
| 4,077,729 | 3/1978 | Schwappach | 37/142 A X |
| 4,192,089 | 3/1980 | Schwappach | 37/142 A |
| 4,357,765 | 11/1982 | Seykora | 37/142 A |
| 4,433,496 | 2/1984 | Jones et al. | 37/141 R |
| 4,501,079 | 2/1985 | Hahn et al. | 37/141 R |
| 4,570,365 | 2/1986 | Bierwith | 37/141 T |

FOREIGN PATENT DOCUMENTS

| | | | |
|---|---|---|---|
| 2349025 | 4/1974 | Fed. Rep. of Germany .... | 37/141 T |
| 989276 | 4/1965 | United Kingdom ............. | 37/142 R |

*Primary Examiner*—Edgar S. Burr
*Assistant Examiner*—Moshe I. Cohen
*Attorney, Agent, or Firm*—Martin A. Farber

[57] ABSTRACT

The shovel for an excavator has teeth arranged at a distance apart from one another on its digging edge. The areas of the edge of the shovel between the teeth are equipped with caps that are relatively resistant to wear and are put on in such a manner that they can be replaced, and have a short hook-like projection which engages under the edge of the shovel and a long leg which fits over the edge of the shovel. Secured to the upper surface of the shovel between the teeth of the shovel are retaining pieces which can fit together with the legs of the caps when the caps are put onto the edge of the shovel and which cooperate with them in an interengaging manner to prevent the legs of the caps from being lifted off from the upper surface of the shovel. Detachable securing members hold the legs of the caps and the retaining pieces together in the direction in which they can be fit together.

8 Claims, 1 Drawing Sheet

SHOVEL FOR AN EXCAVATOR

FIELD AND BACKGROUND OF THE INVENTION

The invention relates to a shovel for an excavator in general.

The digging edge of the shovels of excavators, which are also described, for example, as scoops, according to their shape, are provided with projecting teeth. These comprise tooth retainers which are secured to the edge of the shovel spaced apart from one another and tooth tips made of a highly-wear-resistant material which are attached to the tooth retainers in such a manner that they can be replaced. In order also to protect the edge of the shovel against wear in the gaps between the teeth, instead of using a build-up weld of highly wear-resistant material, which is expensive to replace and can involve difficulties, it is customary to fit the areas of the shovel edge between the teeth with replaceable caps made of a relatively wear-resistant material. It is not suitable in practice to secure the caps with screws or other similar fastenings which are pushed through holes in the wall of the shovel because of the great disadvantage that the stability or strength of the front edge of the shovel, which has to absorb the high working forces acting on the teeth, is appreciably impaired by the fastening holes. A different fastening method, in which the tooth tips are designed with lateral projections such that by means of these projections and positive locking the tooth tips hold the caps between them and keep them pressed against the edge of the shovel, requires the tooth tips to be specially designed. It has the advantages that the caps have to fit the spaces between the teeth and, in the direction in which the tooth tips are put into place, they have to match the fastening position of the tooth tips on the tooth retainers. Also it has the disadvantage that in order to replace the caps the tooth tips also have to be removed from the tooth retainers and in addition the securing devices between the tooth tips and the tooth retainers have to be removed. U.S. Pat. No. 3,995,384 discloses a shovel having a fastening for replaceable parts of the cutting edge, in the case of which, however, the parts of the cutting edge are uniform plates with a large width in the direction of the shovel edge. These cutting edge plates are secured against being pulled off the shovel edge, by a securing bolt which is pushed in parallel to the upper surface and the front edge of the wall of the shovel between the retaining piece on the shovel wall and a tongue-like hooked extension of the cutting edge plate projecting away over the retaining piece. This securing means is not suitable for securing the caps in a shovel and cannot be used for that purpose since the retainers for the teeth that extend to a relatively great length beyond the shovel wall lie at a short distance from each side of a cap and there is no room for a securing bolt insertable on the cap parallel to the surface of the shovel wall. There is also the danger that a securing bolt wedged between the retaining piece and the hooked extension and secured against longitudinal displacement by friction may become loose and fall out as a result, for example, of jarring of the shovel occurring during operation, with the result that the cutting edge parts would fall off the shovel edge.

SUMMARY OF THE INVENTION

It is an object of the present invention to find a solution which will allow the caps for a shovel of the type mentioned at the introduction to be secured to the edge of the shovel simply, reliably and with safety during operation, and in such a manner that they can be replaced, irrespective of the design and method of fastening of the tips of the shovel teeth and above all without mechanical weakening of the shovel wall by holes or the like for cap-securing means projecting through the wall.

By providing the legs of the caps with a yoke-like extension projecting beyond the retaining piece and forming an opening in the legs of the caps, it is possible for the securing members for securing the caps to be mounted perpendicularly to the upper surface of the shovel, through the legs of the caps from above, comfortably and without hindrance from the shovel teeth lying to the side of the caps. As a result of the barb-like interengaging cooperation of the securing member, which can be resiliently compressed in the direction in which the caps are put on, with the yoke-like extension of the legs or with the retaining piece, for example by means of a projection on the securing member, which engages under a projection on the yoke-like leg extension or on the retaining piece, the securing members are reliably fixed against involuntary self-loosening from their secure position.

BRIEF DESCRIPTION OF THE DRAWINGS

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
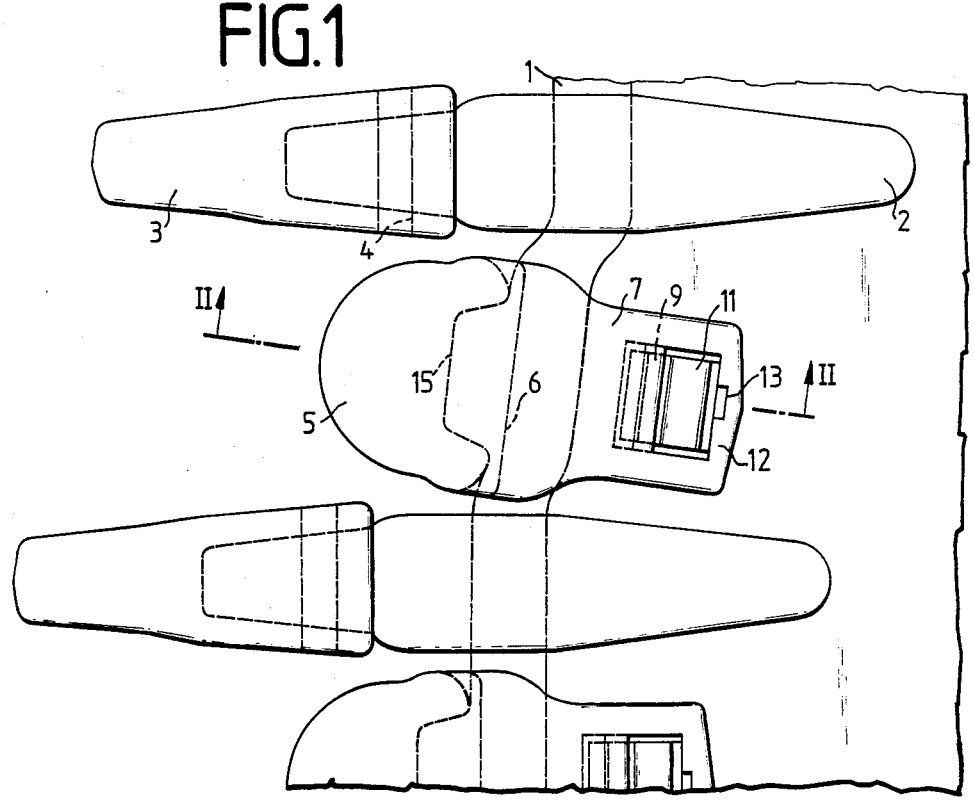
FIG. 1 is a plan view of a part of the shovel.
Figure 2:
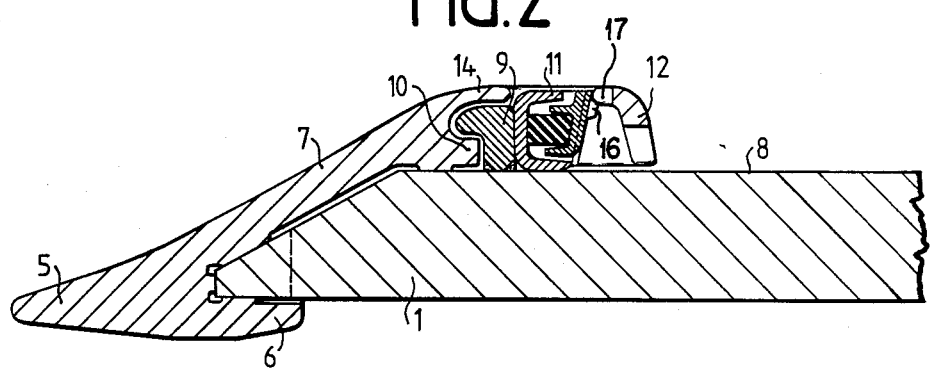
FIG. 2 shows a section along the line II—II in FIG. 1.

Secured to the digging front edge 1 of the shovel at a distance apart from one another are tooth retainers 2 onto which tooth tips 3 are placed in such a manner as to be removable. Indicated customary tooth securing means 4 hold the tooth tips on the tooth retainers. Placed on the regions of the shovel edge 1 between the shovel teeth in such a manner that they can be removed and replaced are caps 5 that are relatively resistant to wear. Each cap 5 has a short hook-like projection 6 which engages under the edge 1 of the shovel and a long leg 7 which fits over the edge 1 of the shovel. The leg 7 rests on the upper surface 8 of the shovel and supports the cap so that it does not tilt round the edge 1 of the shovel when upwardly directed forces act on the cap 5. A retaining piece 9 for each cap is secured to the upper surface 8 of the shovel between the teeth of the shovel by welding. The leg 7 of the cap is designed with a rib 10 facing the retaining piece 9, which rib engages a matching recess in the retaining piece 9 and with this recess forms a groove and tongue connection which can be put together in the direction in which the cap 5 is put on. As a result of this connection, which is positively locking perpendicular to the upper surface 8 of the shovel and can be put together when the cap 5 is put on the edge 1 of the shovel, the leg 7 of the cap is held firmly and prevented from being lifted off or pulled round away from the upper surface 8 of the shovel, and the cap 5 is unable to tilt round the edge 1 of the shovel even under the action of forces directed downwards. A detachable cap fastening keeps the leg 7 of the cap and the retaining piece 9 in engagement in the direction in which they can be put together and the cap 5 pulled onto the edge 1 of the shovel. The cap fastening comprises a securing member 11 which can be put on comfortably from above perpendicularly to the upper surface 8 of the shovel, between opposing surfaces of the retaining piece 9 and a yoke-like extension 12 of the leg 7 of the cap. The yoke-like extension 12 of the leg 7 of the cap can be pushed away over the retaining piece 9 when the cap 5 is placed on the edge 1 of the shovel. The securing member 11 comprises two shells with an intermediate layer of rubber and as a result can be compresed resiliently in the direction in which the cap 5 is put on, the ability of the rubber layer to be compressed being limited by contact of the two shells in such a manner that tensile forces acting on the cap 5 cannot pull apart the positively locking connection between the leg 7 of the cap and the retaining piece 9. By means of the rubber layer the securing member 11 can lock itself automatically in the manner of a barb to the yoke-like extension 12 to prevent itself from lifting out from between the opposing surfaces of the retaining piece 9 and the yoke-like extension 12. A projection 16 of the securing member engages under a projection 17 of the yoke-like extension 12 in the illustrative embodiment. A tool can be inserted into a notch 13 cut into the yoke-like extension 12 in order to compress the securing member for the purpose of removing it. The leg 7 of the cap is designed with a collar-like projection 14 which covers the retaining piece 9, with the result that the retaining piece 9, which is fixed by welding to the shovel and is used again when the cap is replaced, is protected against wear from excavated material. The leg 7 of the cap can be so designed that between the leg of the cap and the retaining piece 9 there is also an interconnection which is effective horizontally in the plane of the upper surface of the shovel and prevents the cap 5 from being displaced laterally on the edge 1 of the shovel. In order to intercept any transverse forces acting on the cap 5 in the direction of the edge of the shovel, the edge 1 of the shovel is preferably designed to have a projection 15 which preferably engages in the manner of a wedge in a corresponding recess in the cap 5 and as a result supports the cap 5 in a positively complementarily locking manner, preventing it from being displaced laterally on the edge of the shovel.

I claim:

1. In a shovel for an excavator, having a digging edge with teeth arranged spaced apart from one another and with caps made of relatively wear-resistant material, the caps being placed on areas of the edge between the teeth in such a manner that they are removable, each of the caps having a hook-like projection which engages under the edge of the shovel and a long leg which fits over the edge of the shovel and retaining pieces being arranged between the teeth on an upper surface of the shovel, the legs of the caps engaging the retaining pieces respectively in a groove and tongue connection positively locking perpendicularly to the upper surface of the shovel when the caps are placed on the edge of the shovel and being held together by respective securing members which are inserted detachably between opposing surfaces of each of said retaining pieces and an extension of the leg of each cap, the extension fitting over the retaining piece, the improvement wherein said extension of the leg of each cap is a yoke-like extension forming an opening, each of said securing members being insertable perpendicularly to the upper surface of the shovel through the opening between the opposing surfaces, the latter comprising a back of each retaining piece and the opposing surface of the yoke-like extension, each of said securing members comprising a first shell-like outer art resting on the respective retaining piece and a second shell-like outer part resting on the respective yoke-like extension and an intermediate layer between said shell-like outer parts, said intermediate layer being resiliently compressible in a direction in which the caps are placed on the edge of the shovel, the yoke-like extension of the leg of each cap and the respective retaining piece constituting elements, and one of said outer parts of each of said securing members engaging one of said elements as a barb to prevent said securing member from lifting out of said opening.

2. The shovel according to claim 1, wherein said shell-like outer parts of the securing member have contact surfaces opposite one another which limit the compressibility of the intermediate layer.

3. The shovel according to claim 1, wherein said caps are formed with recesses, the edge of the shovel has edge projections in the area of the caps, said edge projections engage in said recesses in the caps forming a positive connection active in directions defined by the edge of the shovel.

4. The shovel according to claim 2, wherein said caps are formed with recesses, the edge of the shovel has edge projections in the area of the caps, said edge projections engage in said recesses in the caps forming a positive connection active in directions defined by the edge of the shovel.

5. The shovel according to claim 3, wherein said edge projections wedge into said recesses.

6. The shovel according to claim 4, wherein said edge projections wedge into said recesses.

7. The shovel according to claim 2, wherein said caps include collar-like projections covering said retaining pieces, respectively.

8. The shovel according to claim 2, wherein said retaining pieces project upwardly from said upper surface of the shovel and at an uppermost portion of said retaining pieces said retaining pieces extend substantially perpendicularly toward said edge of said shovel.

* * * * *